United States Patent [19]
Le Corre et al.

[11] Patent Number: 5,587,809
[45] Date of Patent: Dec. 24, 1996

[54] SYSTEM AND A PROCESS FOR TRANSMISSION OF SECURE FAXES

[75] Inventors: Hervé Le Corre, Eterville; Jean-Luc Grimault, Mondeville; Franois Boudet, Fontenay le Marmion, all of France

[73] Assignees: France Telecom Etablissement Autonome de Droit Public, Paris; La Poste, Boulognie Beillancourt Cedex, both of France

[21] Appl. No.: 582,224

[22] Filed: Jan. 3, 1996

Related U.S. Application Data

[63] Continuation of Ser. No. 186,970, Jan. 27, 1994, abandoned.

[30] Foreign Application Priority Data

Jan. 28, 1993 [FR] France ............... 93 00868

[51] Int. Cl.$^6$ .................................. H04N 1/44
[52] U.S. Cl. ................ 358/405; 358/436; 380/18
[58] Field of Search ................... 358/400, 403, 358/405, 406–407, 435, 436; 380/9, 18, 20, 23; H04N 1/44

[56] References Cited

U.S. PATENT DOCUMENTS

| | | | |
|---|---|---|---|
| 5,155,601 | 10/1992 | Toyama . | |
| 5,222,136 | 6/1993 | Rasmussen et al. | 380/18 |
| 5,253,293 | 10/1993 | Shigemitsu et al. | 380/18 |
| 5,291,302 | 3/1994 | Gordon et al. | 358/405 |
| 5,339,361 | 8/1994 | Schwalm et al. | 380/18 |
| 5,404,231 | 4/1995 | Bloomfield | 358/405 |

FOREIGN PATENT DOCUMENTS

| | | |
|---|---|---|
| 0360732 | 3/1990 | European Pat. Off. . |
| 2217949 | 3/1989 | United Kingdom . |

*Primary Examiner*—Kim Vu
*Attorney, Agent, or Firm*—Pearne, Gordon, McCoy & Granger

[57] ABSTRACT

The invention concerns a system and process for sending secure faxes that include a sending fax machine (20); a receiving fax machine (23); and a registered fax server (21). One of the fax machines is provided with a security module that assures document integrity, produces and verifies digital signatures and combats replays.

1 Claim, 2 Drawing Sheets

SYSTEM AND A PROCESS FOR TRANSMISSION OF SECURE FAXES

This is a continuation of application Ser. No. 08/186,970, filed Jan. 27, 1994 now abandoned.

BACKGROUND OF THE INVENTION

This invention concerns a system and a process for transmission of secure faxes.

RELATED ART

The strong points of fax service are its simplicity of use, use of the public telephone network and direct transmission. But there is a weak point: security. This point rules out giving a faxed document legal status.

Indeed, the levels of security offered by the types of faxes known are inadequate and not suited for the demands of some users. The needs for fax security are multiple: confidentiality, authentication, integrity, inability to deny receipt, detection of replay or retransmission.

The fax machines currently on the market do not, for example, offer any real assurance of integrity; alterations can be due to transmission or scanning incidents or to willful acts of falsification.

Nor do these fax machines offer security if the person to whom the fax was sent denies getting it. The fax recipient can, in effect, deny having received the document that the sender certifies he has sent to him. Then it is impossible for the sender to prove the recipient's bad faith or, vice versa, for the recipient to prove the sender's bad faith by proving that he actually received nothing.

Coding devices have been developed by various manufacturers to correct this lack of fax transmission security, but they are based only on coding and do not permit widespread use in an open group of subscribers. Moreover, they require prior exchange of keys.

The purpose of the invention is to offer a solution to the problem of a recipient or sender denying a fax.

SUMMARY OF THE INVENTION

The invention concerns, first of all, a secure fax transmission system that includes:
  a sending fax machine; and
  a receiving fax machine;
characterized by the fact that the system includes a registered fax server.

Conveniently, this transmission system includes at least one secure fax machine that has:
  a control unit;
  a communications module;
  a user interface that makes it possible to establish a dialogue with the user;
  a security module, which makes it possible to produce and verify digital signatures and control replay, including for example a memory card or smart card reader; and possibly a coding/decoding module.

The invention also concerns a secure transmission process with a "registered fax" notice, using a fax server. The process includes the following steps:
  a secure sending step for the document to be faxed from the sending fax to the server, which gives it the name of the recipient;
  a step where the server sends the recipient a "registered" fax notice with a reference number;
  a step where the server is called back by the recipient and authenticated by asking him to send the document on a specific fax machine; and
  a step where the server authenticates the recipient, sending said document to the specific fax machine and sending a "receipt of transmission" to the sending terminal.

The invention thus makes it possible to have "registered fax" service at least equivalent to the postal service's "registered letter," with the same advantages, particularly as regards security of exchanges.

DETAILED DESCRIPTION OF PREFERRED EMBODIMENTS

Figure 1:
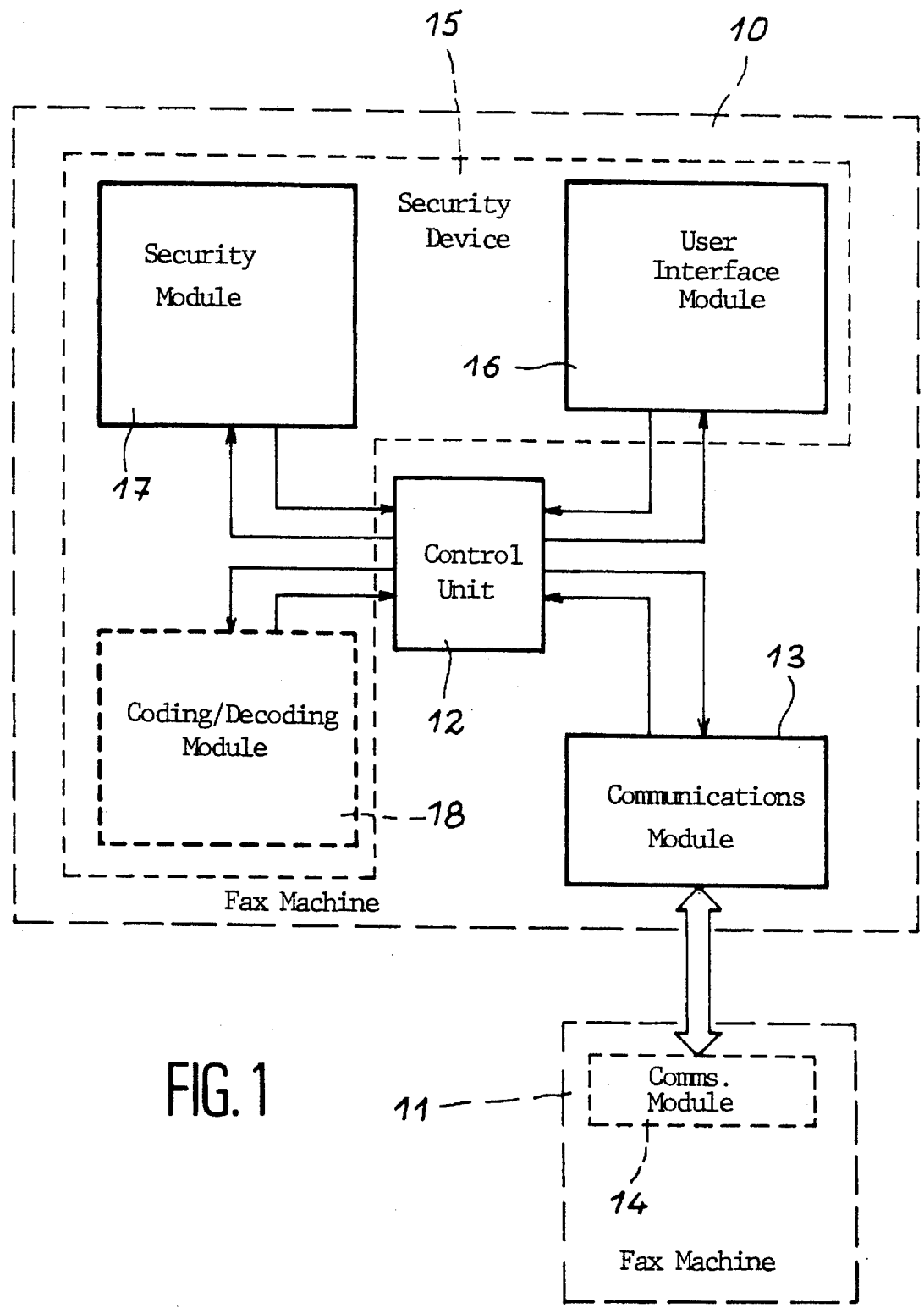
FIG. 1 shows a fax machine that has a fax transmission security device.

FIG. 1 shows the connection between two sending and receiving fax machines 10 and 11. The first fax machine 10 has a control unit 12 with a mass memory and a communications module 13 which can communicate with the communications module 14 inside the second fax machine 11.

The first fax machine 10 also has a security device 15, which includes:
  a user interface module 16 which permits dialogue with the security device 15,
  a security module 17 which permits production and verification of digital signatures and combats replay, and which can include a memory card reader that can read a memory or "smart" card, for each user (or group of users). Replay is fraud which consists of resending a document to the same recipient without his being aware of it, sometimes without the real sender's knowledge.

This device 15 can also include:
  a coding/decoding (that is, encryption/decryption or enciphering/deciphering) module 18 which exists only when the first fax machine 10 requires confidentiality in sending mode.

This device 15 can be a separate device designed to go along with a regular fax machine or a module inside a fax machine that is part of a new generation of so-called "secure" fax machines. In the following description, "secure fax machine" will be used to describe a new-generation terminal or a regular terminal plus a security device that controls, inter alia, the error-correction mode.

To send secure faxes, the sending fax machines must be "secure fax machines."

More specifically, the invention concerns a system for transmitting secure faxes that includes a sending fax machine, a receiving fax machine and a "registered fax" server. Conveniently, one (or both) fax machine(s) is (or are) the type described above.

Such a system can be implemented only by using a server whose authority is recognized.

Figure 2:
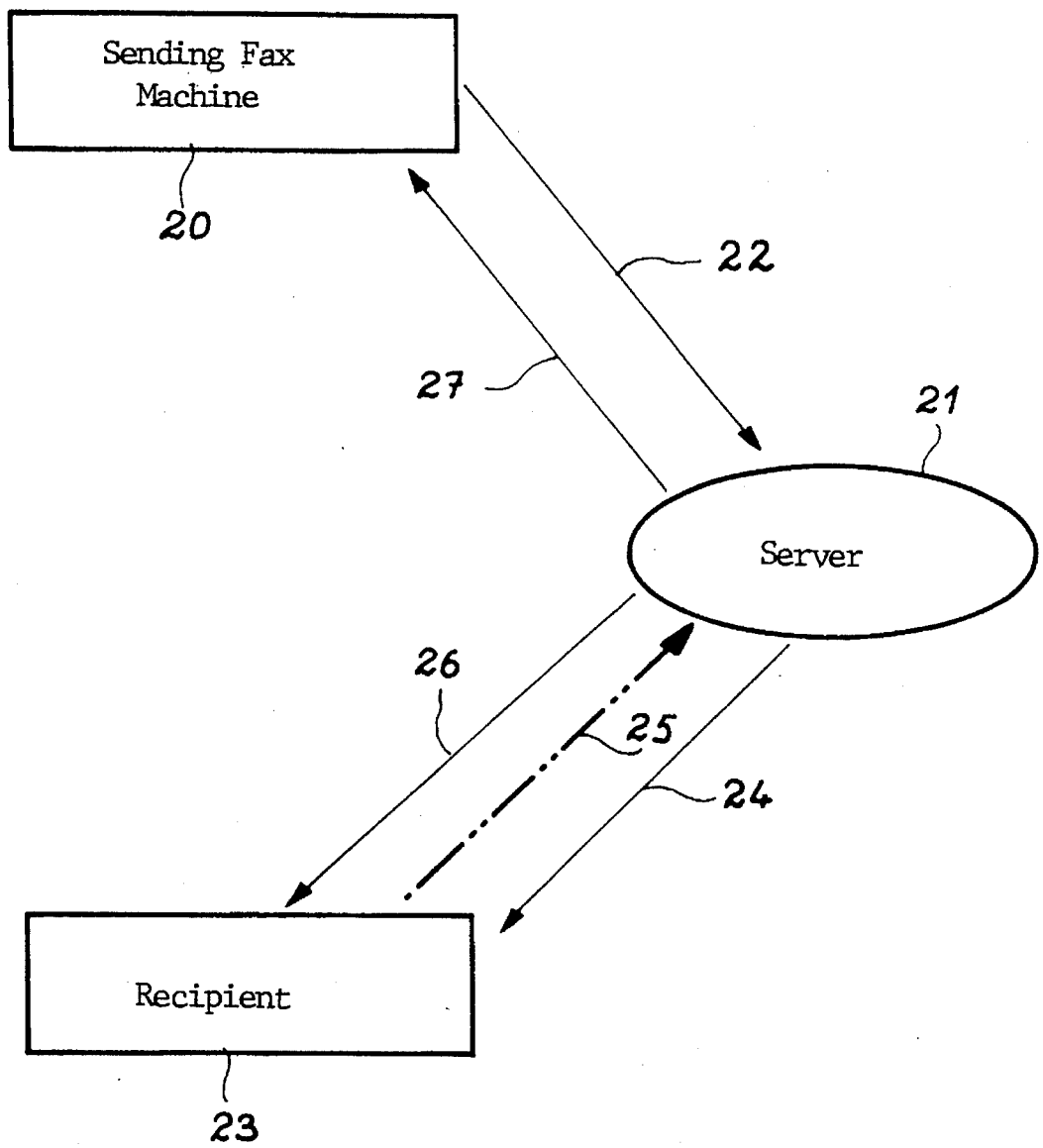
FIG. 2 shows the fax transmission system of the invention.

Referring to FIG. 2, process of secure transmission with a "registered fax" notice using the fax server includes the following steps:

The sending fax 20 sends (connection 22) the document to be faxed to the server 21, giving it the name of the recipient; this sender-server transmission is secure;

The server 21, which controls the dialogue with the recipient 23, sends (connection 24) it a "registered" fax notice which has a reference number;

The recipient 23 calls (connection 25) the server on a telephone, Minitel or fax link with a character recognition system, is authenticated by it and asks it to send the document on a specific fax machine;

The server 21 authenticates the recipient, sends (connection 26) said document to the specific fax machine and sends (connection 27) a return receipt to the sending terminal 20.

The process thus operates as follows.

A user A has a "secure" fax machine, as defined above. He wants to send a "registered fax," coded or not, to a recipient. He then transmits his signed and potentially coded document to the server, indicating the recipient B's I.D. (subscriber to the registered fax service, since the recipient B must have his card and his signature and possibly coding keys).

The server then sends a "registered fax notice" on the fax assigned to the recipient B.

In order to find out about the document, this recipient B calls the server by vocal frequency telephone, Minitel, a character-recognition-based system or any other system that permits authentication and is authenticated. The server verifies the identity of this recipient B and his signature The recipient B tells the server the fax number on which he wants the document to be sent, if it is not his "usual" fax machine. The server finds the document and sends it. The server sends user A a "transmission receipt" containing the time and date the document was first sent. The server stores in its memory so-called "security" information, as well as any anomaly in the procedure, which can be used in case of litigation. This "security" information includes, for example, the date and time of the start of transmission of the document, the number of pages sent, the I.D. of the sending and receiving persons, the random number that made it possible to generate the signatures, etc. Since this information is signed digitally, these signatures are also stored in the server.

The server can provide notarization, i.e., secure long-term archiving of all of the documents exchanged, if the sender asks for it.

After having received the registered fax notice, the recipient B has, for example, 15 days to remove it from the server. If the recipient B has not removed the document before the expiration of this time, a notice of non-transmission is sent to the sender.

Once the document has been sent to the recipient B, it remains available, for example, for a week in the server. Thus, the recipient can ask that it be resent if there was a problem during the first transmission. After which, the document is destroyed or archived. When there is a request to resend the document, the recipient B must again call the server and be authenticated by it.

We claim:

1. A process for secure transmission of a document with a "registered fax" notice, using a fax server, comprising the following steps:

a secure sending step (22) for sending the document to be faxed by a sending fax machine (20) to the server (21) wherein the sending fax machine gives the server a name of a recipient;

a sending step (24) in which the server sends the recipient a "registered fax" notice which has a reference number;

a recall step (25) following the sending step in which the recipient (23) recalls the server and is authenticated by the server by verifying the identity of the recipient and a digital signature of the recipient, and asks the server to send the document on a specific fax machine, with the document remaining available to the recipient for a predefined time; and an authentication step for authenticating the recipient by the server, sending (26) said document to the specific fax machine and sending (27) a receipt that the document was sent to the sending fax machine.

* * * * *